Patented Apr. 26, 1932

1,855,336

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS FOR TREATING RUBBER WITH ALDEHYDE DERIVATIVES, AND PRODUCTS

No Drawing.   Application filed May 14, 1926.   Serial No. 109,177.

This invention relates to a process for treating rubber with aldehyde derivatives and to the products of the process, more particularly to a process for retarding the deterioration of rubber and similar materials such as balata, and gutta percha, and to the products obtained thereby, and is a continuation in part of my application Serial No. 656,453, filed August 8, 1923.

It appears that rubber undergoes deterioration due principally to two causes, one oxidation, and the other over-vulcanization, or continuance of vulcanization past the optimum point. While the present invention is particularly adapted to retarding deterioration due to oxidation, it also has a retarding effect on over vulcanization, and is therefore not limited to retarding deterioration by oxidation.

An object of the invention is to provide a simple process for retarding the deterioration, through oxidation, of rubber, in which the retarding substances may be added before vulcanization to preserve the rubber or similar material while in the raw or vulcanized state. Another object is to provide an improved process for vulcanizing in open air. A further object of the invention is to provide a series of useful, inexpensive products resulting from such process, in which resistance to aging, cracking and over-vulcanization are improved, as well as resistance to stretch and permanent set.

The invention accordingly comprises a process for retarding the deterioration of rubber, which includes combining with rubber before vulcanization a substance having the property of retarding deterioration, which property persists during and after vulcanization, and which may be utilized during the manufacture of rubber articles. It also comprises the products of the process.

In carrying out one form of the invention, 100 parts of rubber are compounded by milling with 10 parts of zinc oxide, 3 parts of sulphur, 0.75 parts of the condensation product of formaldehyde and ethylamine (triethyltrimethylenetriamine) mixed with an equal weight of stearic acid, as set forth in Patent No. 1,444,865, February 13, 1923, and 10 parts of the substantially non accelerating acetaldehyde-aniline condensation product prepared in a strongly acid solution as described in my Patent No. 1,626,784, May 3, 1927 in which substantially 1–1½ molecular equivalents of the aldehyde are combined with substantially 1 molecular equivalent of the amine. The mixture is heated in a mold at 40 pounds steam pressure for 60 minutes, whereupon vulcanization is accomplished. This vulcanized compound has been found to age 300% better than a similar compound prepared without the addition of the acetaldehyde-aniline acid condensation product.

It will be noted that the acetaldehyde-aniline acid condensate has the property of retarding deterioration due to oxidation, and that this property persists during and after vulcanization. It also assists in preventing over vulcanization. In order to compare the resistance to deterioration, two pieces of rubber, one treated as above indicated and the other untreated, each having a thickness of approximately 0.30 inches, were placed in air at approximately 212° F. At the end of 64 hrs. the material treated with the agent to retard deterioration had deteriorated less as shown by tensile strength than the untreated material had at the end of 16 hrs. Instead of placing the rubber in air at a temperature of 212° F. a sample treated by the process given above and an untreated sample, each of the same thickness, have been exposed to the action of sunlight in ordinary air at ordinary temperature with the result that disintegration of the structure of the untreated sample occurred at the end of a short period while the tensile strength of the treated sample had depreciated little, if any.

Instead of employing the formaldehyde condensation product of ethylamine as the accelerator in the above compound, the acetaldehyde-aniline condensate prepared in a weakly acid solution, which accelerates the vulcanization of rubber, as described in my Patent No. 1,627,230, May 3, 1927, may be employed. 0.3 part of this material is preferably used replacing the 0.75 part of the formaldehyde condensate of ethylamine. The vulcanized rubber obtained from this compound when tested as indicated in the last example to determine its resistance to deterioration showed that a piece of treated material has as high tensile strength at the end of 64 hours as a piece of untreated material at the end of 16 hours.

As before stated the acetaldehyde-aniline acid condensate is adapted to retard deterioration but has substantially no accelerating properties. A particular advantage of the use of materials which do not accelerate vulcanization although serving to retard deterioration is that they may be added to rubber in any desired amounts without causing premature vulcanization or undesired changes in the rate of vulcanization. Thus they may be used with various types of accelerators in standard mixes without interfering with the accelerating action of these bodies while at the same time exhibiting their characteristic influence to retard deterioration.

Another method of carrying out the invention is to introduce the acetaldehyde-aniline acid condensate by absorption rather than by milling. In this case a compound consisting of 100 parts of rubber, 100 parts of zinc oxide, 7 parts of sulphur and 2 parts of the formaldehyde ethylamine stearic acid product referred to above is painted with a 20% benzol-alcohol solution of the acetaldehyde-aniline acid condensate and thereafter is vulcanized for 2½ hrs. at 275° F. The aging properties of compounds treated in this way are improved.

As another example employing raw rubber, balata or gutta percha, the following may be cited. A piece of unvulcanized rubber, balata or gutta percha is painted with a 20% benzol-alcohol solution of acetaldehyde-aniline acid condensate. Unvulcanized rubber, balata or gutta percha treated in this way is improved in its resistance to deterioration about 100% as compared with similar untreated material.

Oxidation takes place very rapidly during the vulcanization of stocks in air, particularly when the stocks are in the form of thin sheets, thus tending to make the rubber weak and tacky. One method used to at least partly overcome this trouble is to compound the stock with an excess of a fast accelerator such as litharge, which apparently acts to bring about vulcanization before much oxidation can occur. Even in this case, however, very thin stocks, for instance about .015 inches thick, cannot be successfully vulcanized in air, because they oxidize before they vulcanize. I have found, however, that by the use of the acetaldehyde-aniline acid condensate it is possible to greatly reduce the amount of litharge used in the stock and at the same time obtain a vulcanized stock which does not oxidize during air curing and which ages better, has a better tensile, a reduced gravity, and makes possible the air vulcanization of very much thinner stocks. As an example, the following stocks were prepared.

| | Blank | With acetaldehyde-aniline acid condensate |
|---|---|---|
| Rubber | 100 | 95 |
| Gilder's whiting | 69 | 69 |
| Red oxide | 24 | 24 |
| Pine tar | 6 | 6 |
| Paraffin | .5 | .5 |
| Litharge | 24 | 14 |
| Sulphur | 3 | 3 |
| Acetaldehyde-aniline acid condensate | | 5 |

The stocks were cured with a 35 minute rise to 240° F., a one hour rise from 240 to 270° F., and 30 minutes at 270° F. At the end of 4 days, at 158° F. the stock containing the condensate showed a tensile of 2000 lbs. per sq. inch whereas the stock containing no condensate showed a tensile of about 800 lbs. per sq. inch.

The invention may also be applied by direct admixture of the acetaldehyde-aniline acid condensate with latex, since the condensate does not coagulate latex and if finely ground will not settle out of the latex during a reasonable period. Hence the condensate may be mixed with latex and the latex then coagulated, washed and molded in the regular way to produce a rubber having superior aging qualities. Instead of coagulating the rubber may be desiccated in any desired manner as by spraying.

Another way to improve the aging of rubber formed directly from latex by evaporation is to dip or paint thin sheets of the rubber with a benzol alcohol solution of the acid condensate. For instance, surgeons' gloves formed directly from latex by the dipping process are greatly improved in their aging qualities by being treated in the above manner by the acid condensate.

As another example of the invention a thread compound was prepared as follows: 100 parts of sprayed rubber, 2 parts of zinc oxide, 2 parts of sulphur, 2 parts of oxy normal butyl thiocarbonic acid disulphide, 0.50 parts of phthalic anhydride and 5 parts of acetaldehyde-aniline acid condensate were mixed and calendered to a thickness of .030 of an inch and exposed to aniline fumes at at 140° F. for 14 hrs. Rubber vulcanized in this way resists aging 300% better than ordinary thread stock.

The acid condensate also has been shown to improve the shelf aging of thread stocks by 100% or more. When used in stocks which are aged at any temperature in a stretched condition it reduces both the stretch and permanent set of the stocks. This property is of particular value in the aging of rubber goods such as thread and inner tubes which are used while in a stretched condition.

Typical results of comparative tests of various stocks with and without the acid condensate are as follows:

A commercial tire carcass stock containing 8 parts of sulphur was aged on a roof for four months during the summer. The blank, which showed a tensile strength of about 2500 pounds at the beginning, had its tensile strength reduced to two hundred pounds at the end of the four months, while the same stock containing 5 parts of the acetaldehyde-aniline acid condensate showed a tensile strength of about 2000 pounds after the same aging period.

In the case of inner tube samples which showed a tensile strength of nearly 2500 pounds at the beginning of the test, at the end of three weeks aging at 158° F., the blank had its tensile strength reduced to less than 1000 pounds, while the same stock containing the acid condensate showed practically no deterioration in tensile strength. When aged under 300 lbs. per sq. inch oxygen pressure at 140° F. the blank deteriorated completely in 96 hours while the stocks containing the condensation product lasted for 888 hours. After remaining on the roof exposed to the sun and weather for over two years the blank showed a tensile of 592 lbs. per sq. inch, while the portion of an inner tube containing the acetaldehyde aniline acid condensate showed a tensile of 1905 lbs. per sq. inch.

Pure gum stocks containing 10 parts of sulphur to 100 parts of spray dried or pale crepe rubber showed a reduction in tensile strength from about 3700 pounds to about 400 pounds at the end of 6 days aging at 158° F. Similar stocks containing 5 parts of the acetaldehyde-aniline acid a condensate showed a tensile strength of nearly 4000 pounds at the beginning, which was only reduced to about 300 pounds at the end of 8 days and required 16 days before deterioration approximated that of the blank stock.

A standard hot water bottle stock showing originally 1200 pounds tensile, at the end of 7 weeks aging at 158° F. had its tensile reduced to less than 300 pounds, while the corresponding sample containing 5 parts of the acid condensate had its tensile reduced from about 1400 pounds to slightly below 1200 pounds at the end of 7 weeks. Tests were also made of various colored hot water bottle stocks by keeping the bottles filled with boiling water and the bottles containing the acid condensate in the stock lasted from 2 to 3 times as long as the blanks before bursting.

A thread stock originally showing 1800 pounds tensile had its tensile reduced to less than 400 pounds at the end of 4 days aging at 158° F., while a similar stock containing 5 parts of the acid condensate and showing in initial tensile of about 1900 pounds had its tensile reduced less than 100 pounds at the end of 8 days' aging and event at the end of 16 days still showed a tensile of nearly 700 pounds.

A blank stock containing two parts zinc oxide, 2 parts sudphur and 2 parts oxy normal butyl thiocarbonic acid di-sulphide was aged in air at 212° F. under constant stretch and at the end of 16 hours it had acquired a permanent set of about 175%. The same stock containing 5 parts of acid condensate at the end of 16 hours had a permanent set of only 100%. As definitely showing that the acid condensate prevents deterioration due to oxidation, it is pointed out that when the blank stock was aged in nitrogen for 16 hours it had about the same permanent set, namely 100%, as the stock containing the acid condensate which was aged in air.

A red shoe upper stock which showed an initial tensile of nearly 1700 ponds, at the end of 2 weeks aging at 158% F. had a tensile of only 900 pounds and at the end of 4 weeks this was reduced to about 800 pounds. A similar stock containing 5 parts of the acid condensate and showing an initial tensile of over 1900 pounds at the end of 2 and 4 weeks had its tensile unaffected.

As showing the effectiveness of the acid condensate as a retarder of oxidation during air curing, the following test was made. A blank of .015 inches gauge which showed a tensile of about 850 pounds at the end of 20 minutes air cure above 270° F., at the end of 40 minutes showed a tensile of only about 550 pounds, and at the end of 80 minutes the tensile had dropped to 200 pounds. A similar stock containing 5 parts of the acid condensate showed a tensile of nearly 1100 pounds at the end of 20 minutes cure, which increased to nearly 1300 pounds at the end of 40 minutes and showed a further slight increase at the end of 80 minutes. In a similar manner a blank of .045 inches gauge showed a tensile of over 1500 pounds at 20 minutes, 1400 pounds at 40 minutes and about 1000 pounds at 80 minutes, while a similar stock containing 5 parts of the acid condensate showed a tensile of about 1650 pounds at 20 minutes, a slight increase in tensile at the end of 40 minutes, and a drop in tensile to slightly below 1600 pounds at the end of 80 minutes.

As showing that the acetaldehyde-aniline acid condensation product is not an accelerator of vulcanization, the following test was made: 100 parts of pale crepe, 10 parts of zinc oxide, 3 parts sulphur, and 1 part acid condensate were compounded in the usual manner and heated in a mold for 60 minutes under 40 lbs. steam pressure. The resulting product showed very poor vulcanization and had a tensile strength of less than 1800 pounds per square inch, which is about what would be given if only the zinc oxide and sulphur were present. When ½ part of the accelerating condensate made in weakly acid solution was employed the tensile was 3300 per square inch.

The acid condensate is also valuable by reason of its adaptability under various conditions, since it may be used either with vulcanized or unvulcanized rubber, balata, or gutta percha, and if used in the unvulcanized material the property of retarding deterioration persists during and after vulcanization. It may be milled into rubber, mixed directly with latex, or applied to the material in the form of a solution. In general up to 5% of the condensate with 100 parts of rubber retards the oxidation aging of any stock from 100–400%. This retarding of oxidation occurred in tests made at ordinary temperatures in an aging box at 158° F., at 212° F., and 286° F., and also took place when directly exposed to the sun and weather. This material also retards oxidation during vulcanization in air, above described in detail.

I have discovered that many other substances act in a manner similar to the acetaldehyde aniline acid condensate referred to above in retarding the oxidation deterioration of unvulcanized or vulcanized rubber, gutta percha or balata. These substances may be added to the unvulcanized rubber and exhibit their property of retarding oxidation deterioration during and after vulcanization. They affect the speed of vulcanization but slightly, that is they have no accelerating properties or at most their accelerating properties are negligible compared with powerful accelerators at present employed in the industry. I have found that the condensation products of acetalydehyde and orthotoluidine, para toluidine, meta toluidine, meta-4-xylidene and mono methylaniline, prepared in acid solution according to the process disclosed in my Patent No. 1,626,784, before mentioned, exhibit properties similar to the acetaldehyde aniline acid condensate. I have further found that di-molecular ethylidene aniline or the so-called Eckstein's base which melts at 126° C. and is prepared from acetaldehyde and aniline according to the procedure given in Berichte d. Deut. Chem. Ges. 25, 2020; 27, 1296, exhibits the aforesaid properties in that if added to unvulcanized rubber it greatly retards the oxidation deterioration of the unvulcanized or vulcanized product. This isomer is caused to occur in acetaldehyde-aniline acid condensate as prepared according to Patent No. 1,626,784. This substance does not accelerate the vulcanization of rubber and does not discolor the rubber appreciably. The acetaldehyde acid condensate itself may be reduced with tin and hydrochloric acid, to yield a substance which may be added to unvulcanized rubber to retard its oxidation deterioration in either the vulcanized or unvulcanized state. This material does not accelerate vulcanization appreciably.

I have also found that the condensation products of aniline and cinnamic aldehyde or furfural prepared by a method similar to the one given in my Patent No. 1,626,784, before mentioned, yield products which have properties similar to the above.

The present invention is capable of extensive application in the rubber industry and may be utilized for the manufacture of rubber goods in general, such as boots, shoes and tire casings. In the manufacture of such articles, it enables vulcanization to be carried on with air in direct contact with the articles and under either normal atmospheric pressure or elevated pressures. In the manufacture of tire casings, for instance, air under a pressure of 200 pounds more or less may be applied directly to the interior of the tire so as to maintain a wall-compacting pressure thereon throughout the vulcanizing operation without the interior of the tire becoming soft and tacky due to oxidation. The retarding agent may be applied or incorporated by any suitable or convenient method. The casing may, for instance, be painted with a benzol-alcohol solution of the acetaldehydeaniline acid condensate, but it is preferred to incorporate this retarding agent in the so-called "band ply" which lines the interior of the casing.

There is also an improvement in resistance to cracking in articles made in accordance with the present invention.

The procedures given above produce unvulcanized and vulcanized rubber which is greatly superior in its resistance to deterioration compared with untreated rubber. The processes for treating unvulcanized or raw rubber, gutta percha or balata are also highly effective in avoiding such deterioration. The advantages of these procedures are apparent. The retarding of such deterioration is especially important in connection with the manufacture of tires and the preservation of thin articles such as thread, dental dams, footwear and the manufacture of golf ball covers.

Where the term "rubber" appears in the claims it is intended to include gutta percha and balata. It will be understood that in vulcanizing rubber one does not have to use a material known as Schultz base referred to in my Patent No. 1,626,784, described as having neither acceleration nor retarding qualities, unless the same is found to confer other desired properties upon the rubber.

As many apparently widely different embodiments may be made without departing from the spirit thereof it will be understood that I do not intend to limit the invention except as indicated in the appended claims.

Having thus described my invention, what

I claim and desire to protect by Letters Patent is:

1. A process of vulcanizing rubber which comprises combining with rubber a vulcanizing agent, an accelerator of vulcanization, and a substantially nonaccelerating acetaldehyde-aniline acid condensate having a melting point below 150° C.

2. A process of vulcanizing rubber which comprises combining with rubber a vulcanizing agent, an accelerator of vulcanization, and a substantially nonaccelerating acetaldehyde-aniline acid condensate including di-molecular ethylidene aniline.

3. A rubber product produced by vulcanizing rubber in the presence of a substantially nonaccelerating acetaldehyde-aniline acid condensate having a melting point below 150° C.

4. A rubber product produced by vulcanizing rubber in the presence of a substantially nonaccelerating acetaldehyde-aniline acid condensate comprising di-molecular ethylideneaniline.

5. A process of vulcanizing rubber which comprises combining with rubber a vulcanizing agent, an accelerator of vulcanization, and a substantially non-accelerating aldehyde-aromatic amine condensate resulting from the combination of substantially 1–1½ molecular equivalents of the aldehyde with substantially 1 molecular equivalent of the amine in strongly acid solution.

6. A process of vulcanizing rubber which comprises combining with rubber a vulcanizing agent, an accelerator of vulcanization, and a substantially non-accelerating aliphatic aldehyde-aromatic amine condensate resulting from the combination of substantially 1–1½ molecular equivalents of the aldehyde with substantially 1 molecular equivalent of the amine in strongly acid solution.

7. A process of vulcanizing rubber which comprises combining with rubber a substantially non-accelerating aliphatic aldehyde aromatic amine condensate resulting from the combination of substantially 1–1½ molecular equivalents of the aldehyde with substantially 1 molecular equivalents of the amine in strongly acid solution, a vulcanizing agent and an accelerator of vulcanization, and vulcanizing the rubber.

8. A process of vulcanizing rubber which comprises combining with rubber a substantially non-accelerating acetaldehyde-aromatic amine condensate resulting from the combination of substantially 1–1½ molecular equivalents of acetaldehyde with substantially 1 molecular equivalent of the amine in strongly acid solution, a vulcanizing agent and an accelerator of vulcanization, and vulcanizing the rubber.

9. A process of vulcanizing rubber which comprises combining with rubber a substantially non-accelerating acetaldehyde aniline condensate resulting from the combination of substantially 1–1½ molecular equivalents of acetaldehyde with substantially 1 molecular equivalent of aniline in strongly acid solution, a vulcanizing agent and an accelerator of vulcanization, and vulcanizing the rubber.

10. A rubber product derived from rubber vulcanized in the presence of a substantially non-accelerating aldehyde-aromatic amine condensate resulting from the combination of substantially 1–1½ molecular equivalents of the aldehyde with substantially 1 molecular equivalent of the amine in strongly acid solution.

11. A vulcanized rubber product derived from rubber vulcanized in the presence of a substantially non-accelerating aldehyde-aromatic amine condensate resulting from the combination of substantially 1–1½ molecular equivalents of the aldehyde with substantially 1 molecular equivalent of the amine in strongly acid solution.

12. A rubber product derived from rubber vulcanized in the presence of a substantially non-accelerating aliphatic aldehyde-aromatic amine condensate resulting from the combination of substantially 1–1½ molecular equivalents of the aldehyde with substantially 1 molecular equivalent of the amine in strongly acid solution.

13. A vulcanized rubber product derived from rubber vulcanized in the presence of a substantially non-accelerating aliphatic aldehyde-aromatic amine condensate resulting from the combination of substantially 1–1½ molecular equivalents of the aldehyde with substantially 1 molecular equivalent of the amine in strongly acid solution.

14. A rubber product derived from rubber vulcanized in the presence of a substantially non-accelerating acetaldehyde-aromatic amine condensate resulting from the combination of substantially 1–1½ molecular equivalents of the aldehyde with substantially 1 molecular equivalent of the amine in strongly acid solution.

15. A vulcanized rubber product derived from rubber vulcanized in the presence of a substantially non-accelerating acetaldehyde-aromatic amine condensate resulting from the combination of substantially 1–1½ molecular equivalents of the aldehyde with substantially 1 molecular equivalent of the amine in strongly acid solution.

16. A rubber product derived from rubber vulcanized in the presence of a substantially non-accelerating acetaldehyde aniline condensate resulting from the combination of substantially 1–1½ molecular equivalents of the aldehyde with substantially 1 molecular equivalent of aniline in strongly acid solution.

17. A vulcanized rubber product derived from rubber vulcanized in the presence of a substantially non-accelerating acetaldehyde aniline condensate resulting from the combination of substantially 1–1½ molecular equivalents of the aldehyde with substantially 1 molecular equivalent of aniline in strongly acid solution.

Signed at New York, county and State of New York, this 13th day of May, 1926.

SIDNEY M. CADWELL.